United States Patent [19]

Honda et al.

[11] Patent Number: 4,893,834
[45] Date of Patent: Jan. 16, 1990

[54] AUTOMOTIVE KNEE BOLSTER

[75] Inventors: Kiyoshi Honda; Tsukasa Itoh; Takashi Kojima, all of Saitama, Japan

[73] Assignee: Honda Giken Kogyo Kabushiki Kaisha, Tokyo, Japan

[21] Appl. No.: 207,829

[22] Filed: Jun. 17, 1988

[30] Foreign Application Priority Data

Jun. 18, 1987 [JP] Japan ................. 62-152034

[51] Int. Cl.⁴ ............... B60R 21/04; B60R 21/055
[52] U.S. Cl. ................................. 280/751; 280/752
[58] Field of Search .......... 280/751, 752, 729, 733, 280/745; 297/426, 216

[56] References Cited

U.S. PATENT DOCUMENTS

| | | | |
|---|---|---|---|
| 3,951,429 | 4/1976 | Satzinger | 280/751 |
| 3,984,128 | 10/1976 | Oehm | 280/751 |
| 4,032,175 | 6/1977 | Aibe et al. | 280/751 |
| 4,065,157 | 12/1977 | Abe et al. | 280/751 |

Primary Examiner—Richard A. Bertsch
Attorney, Agent, or Firm—Armstrong, Nikaido, Marmelstein, Kubovcik & Murray

[57] ABSTRACT

An automotive knee bolster for supporting a knee of a vehicle occupant in case of a frontal vehicle crash, comprising: a deformable, energy absorbing member adapted to be placed opposite to a knee of a vehicle occupant; and a substantially rigid, load spreading member attached thereto to spread an impact force applied thereto by the knee to a large area of the energy absorbing member. Since the impact load from the knee is spread over the entire energy absorbing member without producing any localized deformation which would give rise to buckling deformation, the energy absorbing member can absorb a maximum amount of energy at a controlled rate without applying excessive resistance to the knee.

9 Claims, 3 Drawing Sheets

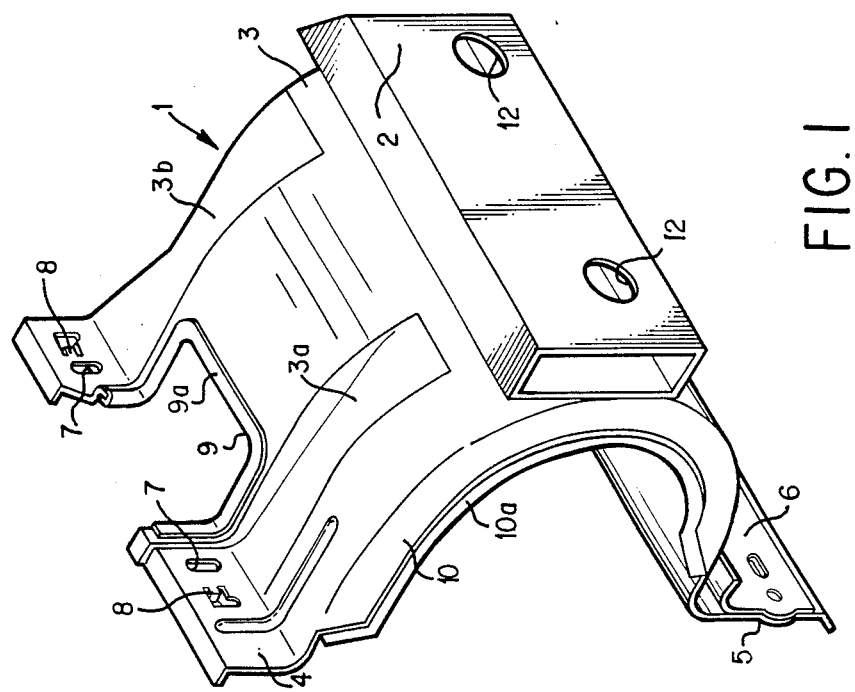
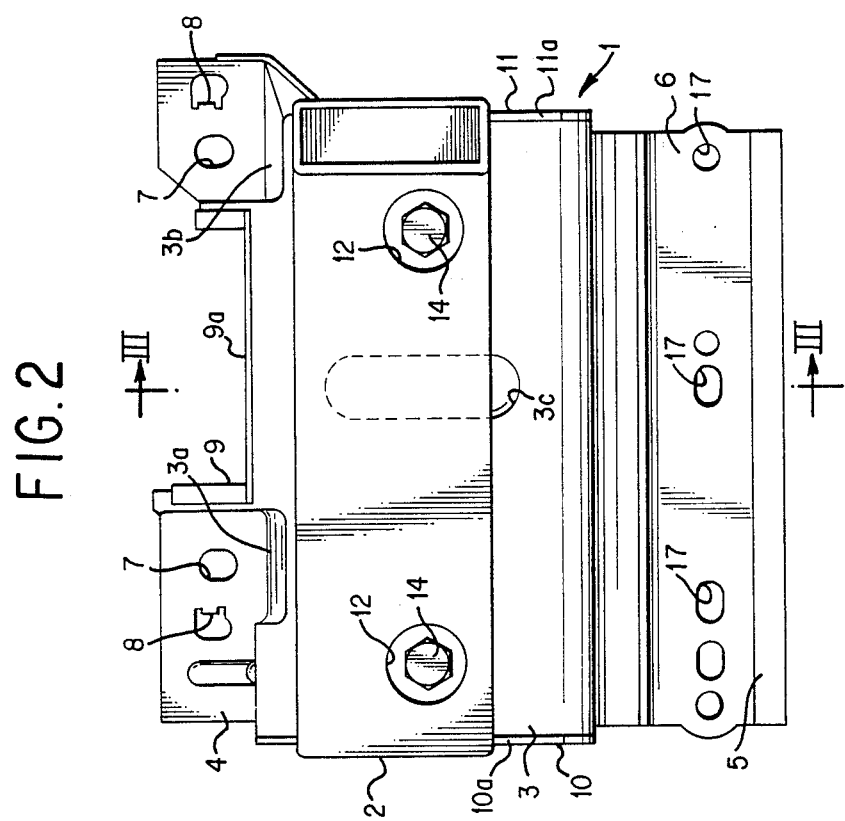
FIG. 1
FIG. 2

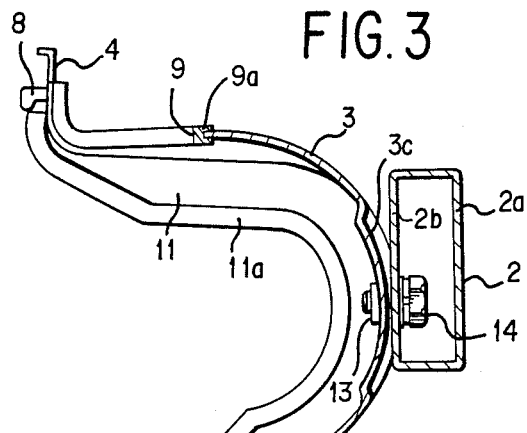
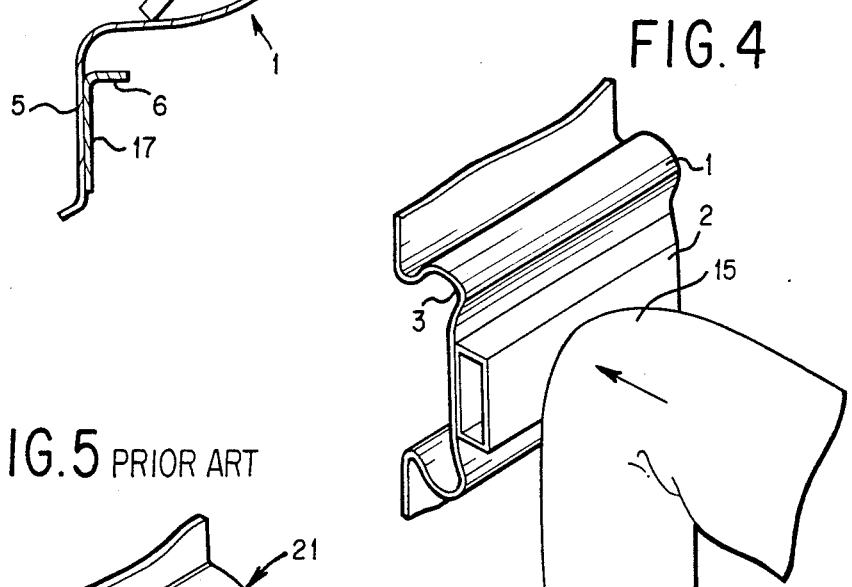
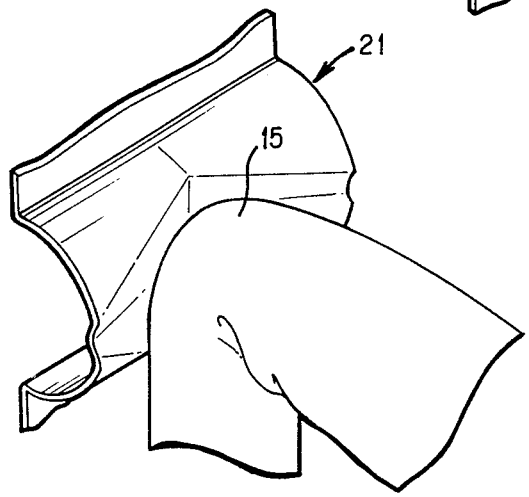

AUTOMOTIVE KNEE BOLSTER

TECHNICAL FIELD

The present invention relates to an automotive knee bolster for supporting a knee of a vehicle occupant in case of a vehicle crash, and in particular to an improve knee bolster which is capable of absorbing a maximum amount of energy from an impact of a knee upon the knee bolster at a controlled rate.

BACKGROUND OF THE INVENTION

In recent years various devices for protecting vehicle occupants from the impact of a vehicle crash have been proposed and some of them have already been put to actual uses. For instance, various forms of passive seat belt and air bag systems have been proposed for protecting the vehicle occupants from the secondary impact or, in other words, the impact arising from the collision of the vehicle occupant with the interior of the passenger compartment due to the inertia force acting on the vehicle occupant in case of a vehicle crash. These systems have been proven to be effective in reducing the possibility and the degree of injury which would be inflicted upon the vehicle occupant.

As an effort to further promote the safety of vehicle occupants from the secondary impact, it has been proposed to use a knee bolster to support the knees of the vehicle occupant. This is effective because, in case of a vehicle crash, although the upper part of the vehicle occupant is restrained by a safety belt or an air bag from being thrown forward, but the lower part of the body tends to be thrown forward with his knees first and the upper part of his body thus tends to be pulled downward.

However, conventional knee bolsters are not necessarily sufficiently effective. For instance, a simple knee bolster consisting of a steel plate pressformed into a box shape tends to deform easily initially and its resistance to the knee tends to increase sharply as the deformation progresses. When a semi-cylindrical knee bolster is used with its cylindrical surface opposing a knee of a vehicle occupant, an impact from the knee causes a central part of the knee bolster to depress further than those parts located on either lateral side thereof, and this in turn causes a sharp increase in the impact force applied to the knee because further deformation of the knee bolster requires a larger amount of buckling deformation. Further, the deformation of the knee bolster is not necessarily stable and, therefore, the resistance which the knee experience may vary depending on various conditions regarding the way in which the knee hits the knee bolster.

U.S. Pat. No. 4,032,175 proposes a knee bolster comprising a tube member having a rectangular cross section and another tube member having a circular cross section fitted into the interior of the rectangular tube member and welded thereto at appropriate locations. According to this proposal, the deformation of the knee bolster may occur in a stable fashion, but the deformation is still localized and an optimum absorption of impact energy cannot be achieved.

BRIEF SUMMARY OF THE INVENTION

In view of these shortcomings of the prior art, a primary object of the present invention is to provide an improved automotive knee bolster which can deform in a stable fashion.

A second object of the present invention is to provide an improved automotive knee bolster which applies a resistance force having a favorable saturation property to the knee upon impact.

A third object of the present invention is to provide an improved automotive knee bolster which is economical and easy to manufacture.

These and other objects of the present invention can be accomplished by providing an automotive knee bolster for supporting a knee of a vehicle occupant in case of a vehicle crash, comprising: a deformable, energy absorbing member adapted to be placed opposite to a knee of a vehicle occupant; and a substantially rigid, load spreading member attached thereto to spread an impact force applied thereto by the knee to a large area of the energy absorbing member.

Thus, since the impact from the knee is distributed evenly over the whole energy absorbing region of the knee bolster, the deformation of the knee bolster takes place in a stable manner and the resistance which the knee receives from the knee bolster acquires a favorable saturation property. As a result, the knee bolster can absorb a maximum amount of energy at a controlled rate, thereby without causing any substantial injury to the knee.

According to a certain aspect of the present invention, the energy absorbing member comprises a sheet metal member which is press formed into a semicylindrical shape with its rounded surface opposing the knee and its axial direction extending laterally for a favorable permanent deformation property. Since the cross section of the energy absorbing member is semicircular, it would not readily collapse as opposed to the one having a rectangular cross section which is prone to shear deformation.

According to another aspect of the present invention, the energy absorbing member is provided with a depression extending along its circumferential direction and/or integrally formed flanges at its axial ends for adjusting the ease of deformation of the energy absorbing member.

Preferably, the load spreading member consists of a beam having a certain depth, for instance a hollow tube member of a rectangular cross section having a pair of vertical walls and extending laterally across the energy absorbing member, one of the walls being fixedly attached to the rounded surface of the energy absorbing member so as to extend along a tangential direction of the energy absorbing member while the other vertical wall extends in parallel with the said vertical wall at a certain space therefrom.

However, the specific structures of the energy absorbing member and the load spreading member may be modified as desired as one can easily appreciate from the appended claims and the following description of the preferred embodiment of the present invention.

BRIEF DESCRIPTION OF THE DRAWINGS

Now the present invention is described in the following with reference to the appended drawings, in which:

FIG. 1 is a perspective view of a preferred embodiment of the knee bolster according to the present invention;

FIG. 2 is a front view of the knee bolster shown in FIG. 1;

FIG. 3 is a sectional view taken along line III—III of FIG. 2;

FIG. 4 is a perspective view showing a manner of deformation of the embodiment shown in FIGS. 1 through 3;

FIG. 5 is a view similar to FIG. 4 showing a manner of deformation of a conventional knee bolster.

DETAILED DESCRIPTION OF THE PREFERRED EMBODIMENT

Figure 6:
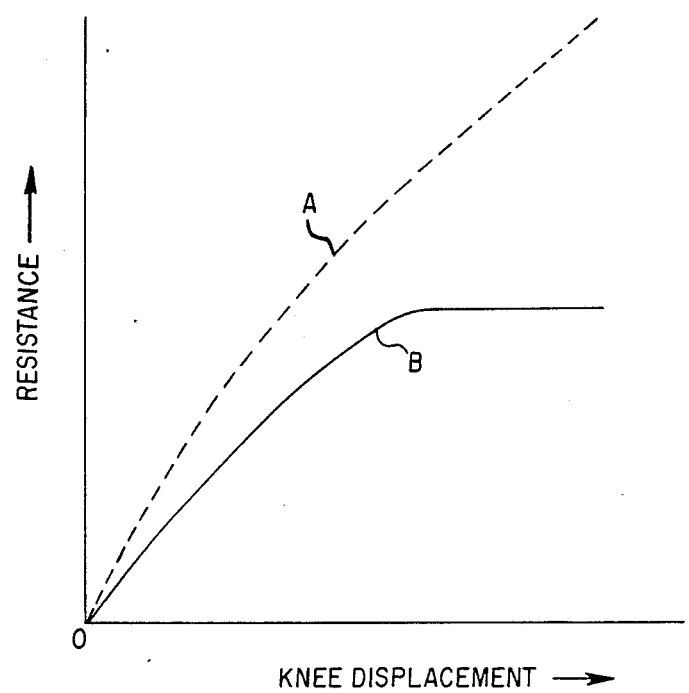
FIG. 6 is a graph showing the time-deformation relationships of a knee bolster according to the present invention and a conventional knee bolster.

FIGS. 1 through 3 show a preferred embodiment of the automotive knee bolster according to the present invention. This knee bolster 1 for absorbing the energy of a secondary impact upon a knee of a vehicle occupant in case of a frontal vehicle crash comprises a main part 3 having a semi-cylindrical shape for favorable absorption of impact energy and a load spreader 2 built as a box attached to a front surface of the main part 3. The main part 3 and the load spreader 2 are both made of press-formed sheet metal such as steel. The main part 3 has a substantially semi-cylindrical hollow shape with its central axial line extending laterally of the vehicle. The load spreader 2 is shaped as a hollow box having open side ends. The rear portion of the main part 3 is provided with a pair of flanges 4 and 5 by bending the upper and the lower fringe portion of the main part upward and downward, respectively, for mounting the knee bolster 1 to a lower part of the instrument panel of the passenger compartment of the vehicle.

The upper flange 4 is provided with a pair of holes for passing mounting bolts therethrough and a pair of tabs 8 bent perpendicularly from the flange 4 rearward or away from the load spreader 2 for positioning the knee bolster 1 at a predetermined part of a panel member located below the instrument panel. A middle part of the flange 4 is provided with a cut-out portion 9 which extends into a part of the semicylindrical main part 3 of the knee of bolster 1. The edge of the main part 3 adjacent to this cut-out portion 9 is covered by a edge cover 9a.

The lower flange 5 is reinforced by a reinforcement plate 6 having an L-shaped cross section and attached to the lower flange 5. A plurality of holes 17 are provided in the lower flange 5 and the reinforcement plate 6 for passing threaded mounting bolts (not shown in the drawings) therethrough.

The lateral ends of the main part 3 of the knee bolster are bent inwardly into flanges 10 and 11 and their edges are covered by edge covers 10a and 11a similar to the edge cover 9a. The upper surfaces of a middle part and a right most part of the upper half of the main part 3 are provided with depressions 3a and 3b extending along a circumferential direction of the semi-cylindrical main part 3, and a depression 3c having an elongated circular shape is provided in a front surface of the main part 3 of the knee bolster 1 in a region located between the two depressions 3a and 3b. These depressions 3a, 3b and 3c, as well as the cut-out portion 9 and the flanges 10 and 11, affect the ease of the plastic deformation which the knee bolster undergoes in case of a crash as the knee 15 of a vehicle occupant is pushed upon the knee bolster (FIG. 4).

The load spreader 2 has a pair of vertical walls 2a and 2b extending in mutually parallel relationship and the wall 2b adjacent to the main part 3 is provided with a pair of laterally spaced holes, and threaded bolts 14 are passed through these holes and threaded with nuts 13 welded to the main part 3 of the knee bolster 1 to securely attach the load spreader 2 to the main part 3 of the knee bolster 1. The vertical wall 2a remote from the main part 3 is provided with similar but slightly larger holes 12 to permit access to the heads of the threaded bolts 14. If desired, the load spreader 2 may be covered with a padding consisting of soft, synthetic resin material as desired in order to reduce the possibility of injuring the knee when it hits against the load spreader 2.

FIG. 5 shows a typical way in which a conventional knee bolster 21 undergoes a deformation when a knee 15 of a vehicle occupant hits the knee bolster in case of a vehicle crash. Since the deformation of the knee bolster 21 tends to be local and involves a three dimensional deformation, the deformation starts involving a certain amount of buckling deformation as the deformation of the knee bolster progresses. Therefore, the resistance which the knee encounters with an increase in the deformation of the knee bolster tends to increase sharply as shown by the broken line A given in the graph of FIG. 6. This is not desirable because the knee bolster is required to absorb a maximum amount of energy within a limited range of deformation thereof, further, by applying resistance of a limited magnitude to the knee so as not to cause injury to the knee.

On the other hand, according to the present invention, since the impact upon the knee bolster from a knee is evenly distributed laterally substantially along the whole length of the knee bolster, the deformation of the knee bolster occurs evenly along its length and the plastic deformation of the knee bolster occurs over its entire part. As a result, the resistance which the knee bolster applies to the knee quickly saturates as the deformation advances as shown by the solid line B in the graph of FIG. 6. This is desirable because the amount of energy absorption is maximized for a given stroke of deformation of the knee bolster while the resistance to the knee is limited within a safe level.

What we claim is:

1. An automotive knee bolster for supporting a knee of a vehicle occupant in case of a vehicle crash, comprising:
   a deformable, energy absorbing member adapted to be placed opposite to the knee of the vehicle occupant, said energy absorbing member consisting of a sheet metal member having a predetermined lateral width; and
   a substantially rigid, load spreading member attached thereto to spread an impact force applied thereto by the knee to a substantial area of said energy absorbing member, said load spreading member comprising a front plate opposite to the knee of said vehicle occupant and a rear plate securely attached to the front plate by means of an upper connecting member and a lower connecting member such that said front and rear plates extend in parallel with and in a spaced relationship with each other.

2. An automotive knee bolster as defined in claim 1, wherein said energy absorbing member comprises a sheet metal member formed into a semi-cylindrical shape having a rounded surface, said rear plate of said load spreading member being securely attached to said rounded surface, and a central axis of said semi-cylindrical shape being extended laterally.

3. An automotive knee bolster as defined in claim 2, wherein said energy absorbing member is provided with a depression extending along a circumferential direction of said semi-cylindrical shape.

4. An automotive knee bolster as defined in claim 2, wherein said energy absorbing member is provided with an integrally formed flange at each axial end thereof.

5. An automotive knee bolster for supporting a knee of a vehicle occupant in case of a vehicle crash, comprising:

a deformable energy absorbing member adapted to be placed opposite to the knee of the vehicle occupant, said energy absorbing member comprising a sheet metal member formed into a semicylindrical shape having a depression extending circumferentially therearound for a predetermined length, with a rounded surface opposite to the knee of the vehicle occupant, and a central axis of said semi-cylindrical shape being extended laterally; and a substantially rigid, load spreading member attached to said deformable energy absorbing member in order to spread an impact force applied thereto by the knee to a substantial area of said energy absorbing member.

6. An automotive knee bolster as defined in claim 5, wherein said energy absorbing member is provided with an integrally formed flange at each axial end thereof.

7. An automotive knee bolster as defined in claim 6, wherein said load spreading member comprises a hollow tube member of a rectangular cross section having a pair of vertical walls, one of said walls is fixedly attached to a rounded surface of said energy absorbing member so as to extend along a tangential direction of said energy absorbing member while the other vertical wall extends in parallel with said one vertical wall with a certain clearance therebetween.

8. An automotive knee bolster as defined in claim 7, wherein said hollow tube member of said load spreading member extends laterally across said energy absorbing member.

9. An automotive knee bolster for protecting a knee of a vehicle occupant in case of a vehicle crash, comprising:

a deformable energy absorbing member adapted to be placed opposite to the knee of the vehicle occupant and being made of a sheet metal formed into a semi-cylindrical later member having a first axial width, said semi-cylindrical member having a flange at each of both side ends thereof for fixedly securing the same in said vehicle; and a load spreading means attached substantially at an apex of said semi-cylindrical lateral member for receiving an impact from the knee, said load spreading means having a semi-circular cross-section and a second width substantially equivalent to said first axial width and a predetermined rigidity such that when said load spreading means receives the impact from the knee at the vehicle crash said load spreader means does not bend itself while said semi-cylindrical member along laterally uniformly bend at a controlled rate gradually.

* * * * *